July 7, 1953  M. J. DIKEMAN  2,644,561
FLUID POWER DRIVE AND CONTROL UNIT
Filed April 12, 1948  4 Sheets-Sheet 1

INVENTOR.
Myron J Dikeman

July 7, 1953        M. J. DIKEMAN        2,644,561

FLUID POWER DRIVE AND CONTROL UNIT

Filed April 12, 1948        4 Sheets-Sheet 2

INVENTOR.

Myron J. Dikeman

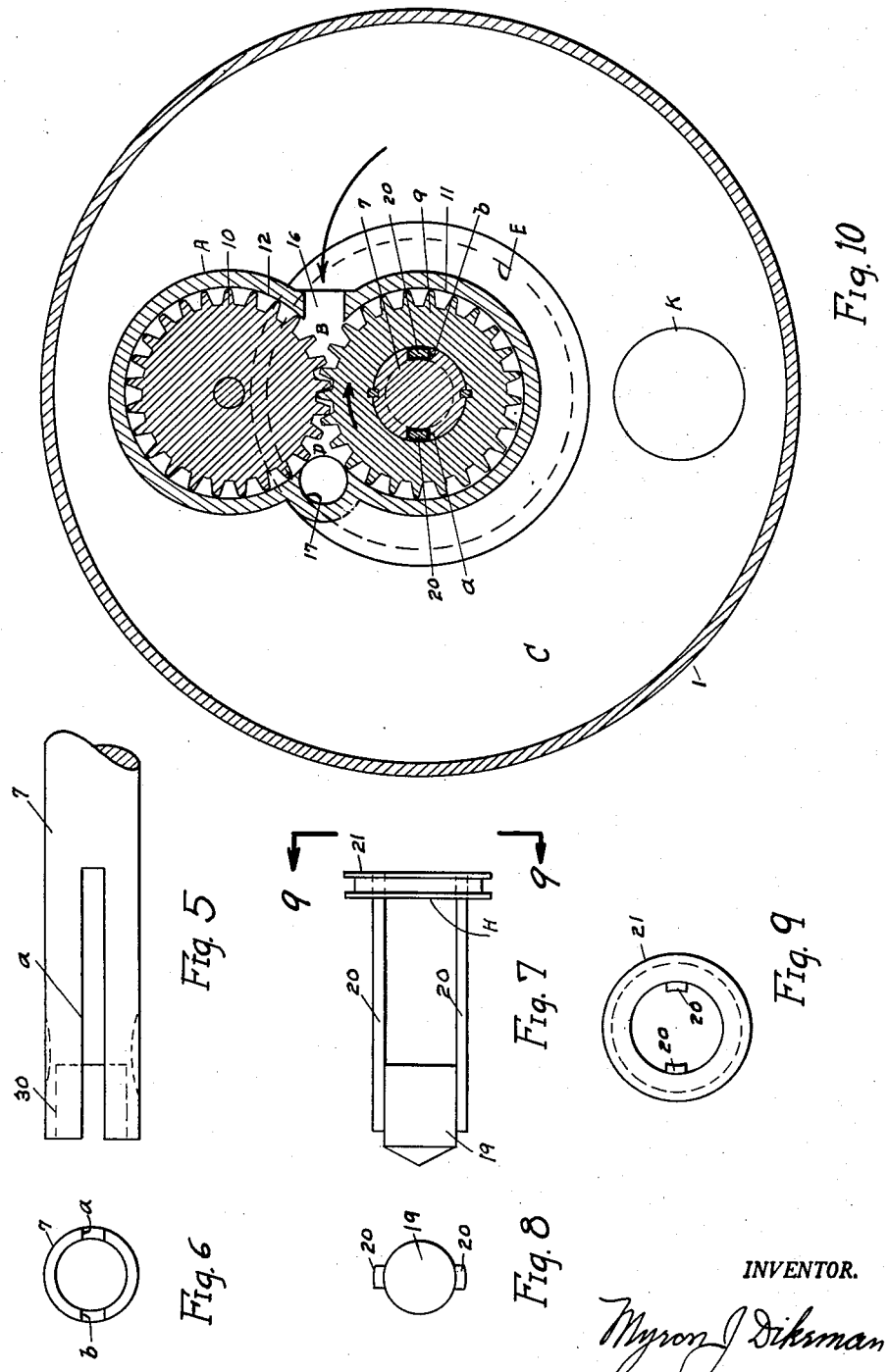

July 7, 1953 M. J. DIKEMAN 2,644,561
FLUID POWER DRIVE AND CONTROL UNIT
Filed April 12, 1948 4 Sheets-Sheet 4
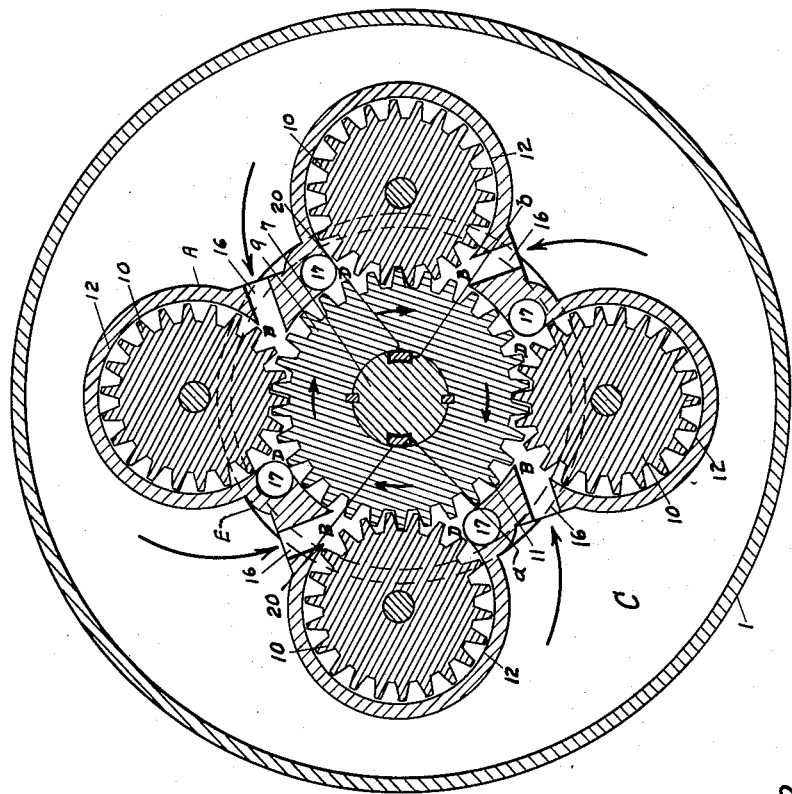
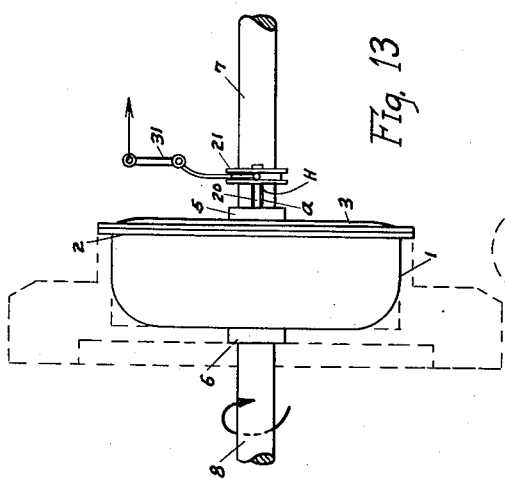
INVENTOR.
Myron J Dikeman Patented July 7, 1953

2,644,561

UNITED STATES PATENT OFFICE 2,644,561

FLUID POWER DRIVE AND CONTROL UNIT

Myron J. Dikeman, Grosse Pointe Woods, Mich.

Application April 12, 1948, Serial No. 20,513

3 Claims. (Cl. 192—61)

The object of my invention is to provide a power drive and speed control unit, for connecting adjoining rotatable section units operatively, actuated and controlled by a fluid driving medium.

Another object is to produce a fluid power driving unit for connecting parallel, adjoining shafting sections together, that will allow the driving shaft section to rotate, when desired, without effecting the rotations of the connected driven shaft, and which can be readily connected therewith through the driving unit fluid mechanism.

A further object is to provide a fluid power driving unit for connecting parallel adjoining drive and driven rotatable sections together, and provided with control means for varying the torque force and speed as transmitted to the driven section, from a zero to a predetermined maximum, and without changing the rotations or velocity of the driving shaft or connecting unit.

A still further object is to provide a fluid power control and brake unit, for regulating, controlling, stopping or locking a connected rotatable shaft or wheel, or rotatable operating member.

Another object is to provide a fluid power drive and control unit that is simple in construction, that can be installed either as a driving unit, or a brake unit, or a shaft lock, easily and efficiently operated and that can be manufactured at a very low cost.

These several objects are attained in the preferred form by the construction and arrangement of parts more fully hereinafter set forth.

Similar parts on all drawings are marked by similar numerals or letters.

Fig. 5 is a detail view of one inner shaft end, showing the recess design formed therein for movably mounting the control valve and frame thereon.

Fig. 6 is an end view of the shaft shown in Fig. 5, showing the relative position of the various recesses formed therein.

Fig. 7 is a side elevation of the fluid valve control frame designed for mounting over the recessed shaft end.

Fig. 8 is an end view of the valve control frame, showing the closing valve plug design and the slide attachments thereto.

Fig. 9 is an end view taken on the line 9—9 of the Fig. 7, showing the clutch operating collar and valve slide members attached thereto.

Fig. 10 is a modified cross-sectional view also taken on the line 3—3 of the Fig. 1, illustrating a modified control mechanism with one of the idler gears omitted.

Fig. 11 is a further modified cross-sectional view also taken on the line 3—3 of the Fig. 1, illustrating the addition of extra idler gears to the control section.

Fig. 12 is a diagrammatic elevation of the assembled unit illustrating the driving force as applied through the connected rotatable shaft section, when mounted as a brake unit.

Fig. 13, is also a diagrammatic elevation of an assembled unit illustrating the driving force as applied thereto through the fixed casing shaft, as when the control unit is mounted within an engine fly-wheel.

Figures 1, 2:
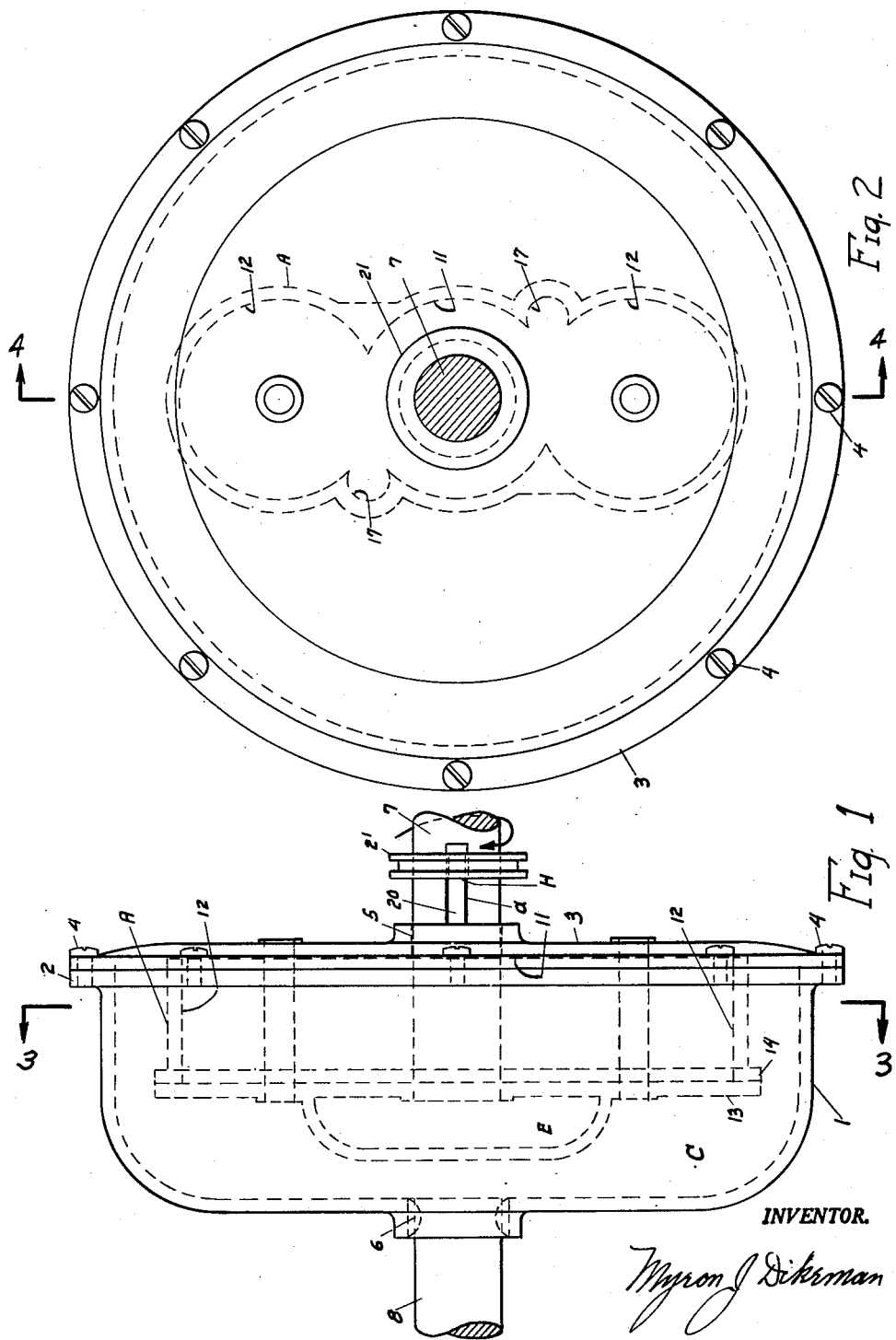
Fig. 1 is a side elevation of the assembled driving and control unit, showing the general exterior design, and the arrangement of the interior compartment walls.
Fig. 2 is an end elevation of the assembled unit showing the circular demountable casing head, and the relative position of the fluid control unit mounted therein.

In general, my invention, as illustrated, comprises a closed cylindrical casing, filled with a suitable driving fluid, said casing being formed with central shaft bearing openings, positioned concentric with the casing axis, and provided with a high pressure gear recirculating fluid control pump fixedly mounted within the casing chamber immersed in said fluid. A driving and a driven shaft section mounted in opposite casing end bearing openings, one of which is rotatably mounted therein and connected operatively to the fluid control pump gears, the opposite shaft section being fixedly mounted in its respective casing bearing opening and rotates therewith except when casing is fixedly mounted. Valve means for regulating the fluid flow through the gear control pump, provided with adjusting means for regulating said valve displacement.

I will now describe more fully the detailed construction of my device, referring to the drawings and the marks thereon.

Figure 3:
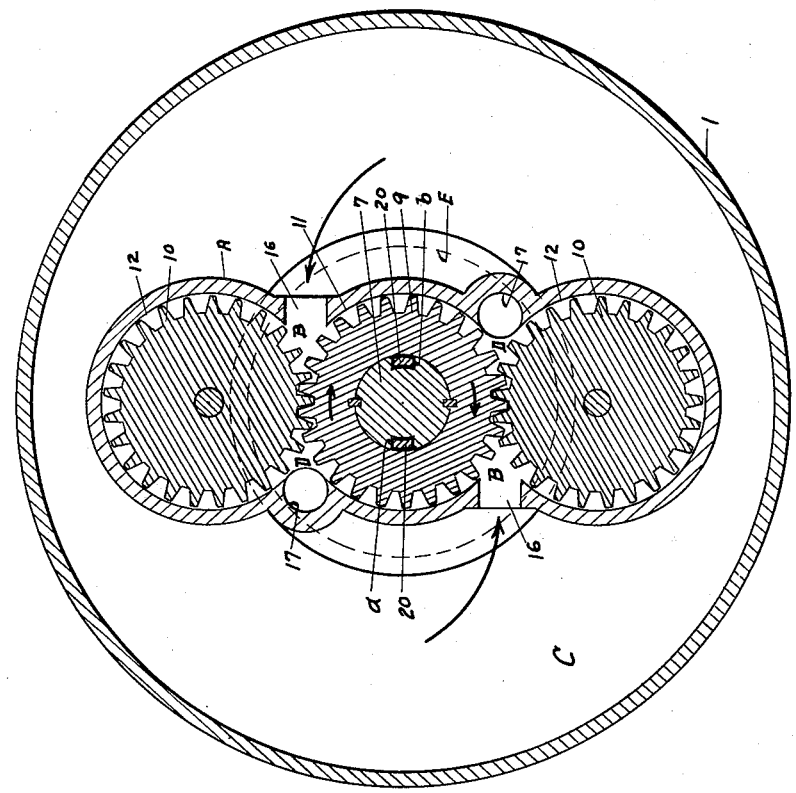
Fig. 3 is a cross-sectional view taken on the line 3—3 of the Fig. 1, showing the control gears mounted within the unit casing, and the respective fluid outlets.
Figure 4:
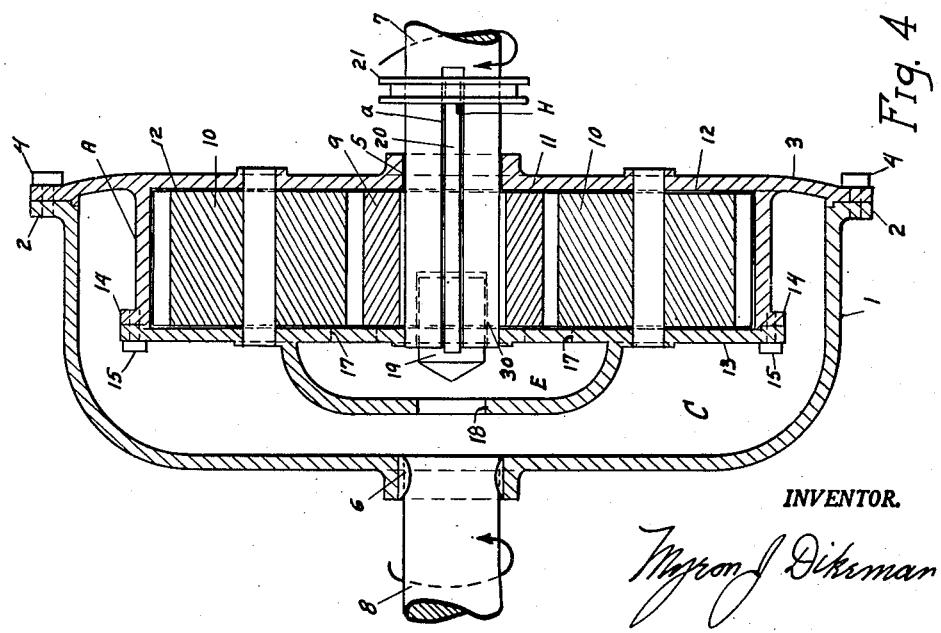
Fig. 4 is a cross-sectional view taken on the line 4—4 of the Fig. 2, showing the relative position of the control gears and connecting fluid chamber compartments.

While my invention is applicable and operative either as a driving or speed control unit, and a brake or lock unit, and with the driving force applied to either shaft section, it is herein illustrated as a shaft driving unit with the driving force applied to the rotatably mounted shaft connected directly to the pump gear, and showing the fluid control valve as mounted on the same respective shaft end, and as illustrated in the Figs. 1 to 4 of the drawings, and includes the brake application also.

The casing 1 is made of suitable metal, either cast, turned, or pressed, as the case may require, preferably cylindrical in design closed at one end, and is provided with turned circular flanged edges 2 at the opposite open end. A turned circular casing head 3 is mounted over the end flanges 2, and securely bolted and sealed thereto by the threaded cap screws 4, or by any other suitable means. Shaft bearing openings 5 and 6 are formed concentric with the casing axis. Within the bearing 5 is rotatably mounted the drive shaft 7 having its inner end projected within the casing chamber C. Within the opposite casing bearing 6 is fixedly mounted a driven shaft section 8 which is projected outside said casing. Both the shaft sections 7 and 8 being properly supported in suitable external bearings not shown herein. Within the casing 1 is fixedly mounted a gear high pressure recirculating liquid pump unit A, herein illustrated in the preferred form, as a triple spur gear assembly, although other types of gears, and gear assemblies, are also applicable, as the number of idler gears is not material to its operation. The gears 9 and 10 are flat gears, preferably of equal diameters, and are rotatably mounted within true, surface fitting, cylindrical gear chambers 11 and 12, projected and formed on the inner surface of the casing head 3 integral therewith. Said cylindrical gear chambers being positioned diametrically across the casing head and projected at right angles therefrom and parallel to the casing shafting axis and symmetrical therewith. The drive gear 9 is fixedly mounted on the inner end of the drive shaft 7 and is rotatable therewith within the central, surface fitting, gear chamber 11. The outside idler gears 10 are rotatably mounted on opposite sides thereof, within their respective surface fitting gear chambers 12, positioned to mesh with the drive gear 9 and rotate therewith. The walls of the chambers 11 and 12 are designed to fit the respective gear surfaces and teeth ends substantially liquid tight, yet allow said gears to rotate freely therein. A head plate 13 is fixedly mounted over the gear chamber end, fixedly attached to the wall flange 14 by cap screws 15, said cap plate also being designed as a surface fit with the adjacent gear ends, forming liquid seal gear compartments throughout. On opposite sides of the triple gear chamber casing A, opposite the respective external gear tooth rotation intersections B, are formed fluid intake opening 16, leading from the casing chamber C directly into the respective gear teeth intersections. On the alternate opposite sides of said casing walls, and opposite the respective internal gear teeth rotation intersections D, are formed fluid outlet openings 17, leading from the respective gear chambers into a common fluid outlet chamber E, then through an outlet port 18 back into the casing chamber C. When the casing chamber C is filled with suitable fluid, the same will flow through the intake openings 16, directly into the gear teeth recesses, rotating therewith around the outer chamber circumferences, and is then expelled through the fluid outlets 17 and 18, as the converging gear teeth are meshed together at the internal tooth rotation intersection, and in the same manner as the ordinary high pressure gear liquid pumps operate. The fluid filled chamber C is a volume medium for returning all the outlet port fluid back to the respective gear inlet ports, for recirculation therethrough. The fluid outlet port 18 is centrally located, positioned concentric with the axis of the drive shaft 7, and adjacent to the inner end thereof. Slidably mounted on the inner end of one of said shaft sections, herein illustrated as on the rotatable drive shaft 7, is a fluid control valve frame H, comprising the valve plug 19 positioned concentric with the shaft axis, and fluid outlet port 18, and slidably mounted within the shaft end cylindrical recess 30, and carries oppositely positioned slide bars 20 fixedly attached thereto. The slide bars 20 are designed and positioned to engage and slide through the respective shaft grooves $a$ and $b$ extended along the shaft sides to a position outside the casing end bearing 5. The outer ends of the slide bars 20 are fixedly attached to a circular grooved clutch collar 21, and which is slidable in either direction along the shaft 7, by any suitable clutch engaging means, illustrated as a pivoted clutch operating fork 31, in Fig. 13, of the drawings. The assembled valve frame H is free to slide on the shaft for displacing the attached valve plug 19 to any desired position for regulating the fluid flow, or closing the port 18 altogether, as desired. The frame H and valve plug 19 may also be mounted on the shaft 8 equally as well, and could be operated from either casing end, if desired, as illustrated in the Fig. 12, by the frame lines H'.

When the entire casing and assembly is filled with a suitable driving fluid, and the outlet port 18 is open during rotation of the driving shaft 7, the gears 9 and 10 rotate therewith, and the casing fluid passes freely therethrough, entering the intake ports 16 and expelled through the outlet ports 17 and 18 and back into the casing chamber C continually recirculating, and without affecting the casing 1 and attached shaft 8, as no turning torque is transmitted thereto. As the valve plug 19 is displaced by the connecting frame H and clutch ring 21, and outside operating mechanism, so as to engage and close said fluid outlet port 18, all gears 9 and 10 of the high pressure pump assembly are locked, by the fluid back pressure therein, and further gear rotation is prevented within the respective chambers 11 and 12, therefore the casing 1 and attached shaft 8 is forced to rotate with the connected drive shaft 7, as a single unit. As the valve plug 19 is adjusted between the open and closed positions, the gear control unit fluid flow is varied proportionately with the port opening and the resulting casing rotations are varied in inverse ratio therewith, from zero rotation when the port 18 is wide open, to a maximum rotation of the drive shaft 7 when said port 18 is fully closed. The size of the outlet port 18 determines the fluid flow, and resulting driven shaft speed, effective in both rotatably and fixedly mounted casings. The size and thickness of the gears may be varied, as desired, for changing the fluid capacity and the strength of the unit, depending upon the actual power required transmitted therethrough. Inasmuch as the fluid filled chamber C is a recirculating medium between the respective gear casing outlet and inlet ports, it may be reduced to any design or size, so long as the fluid passage between the respective ports is maintained, and subject to valve control, and may be reduced to a mere channel passage therebetween, when desired.

While Figs. 1 to 4 illustrate the preferred design because of a perfect balanced control mechanism, yet one of the idler gears 10 may be omitted, if desired, for further simplicity of gear assembly, and as illustrated in the Fig. 10 of the drawings. The operation is the same as previously described, and the casing may be again balanced by a suitable weight K mounted thereon.

A further modification is illustrated in the Fig. 11 of the drawings, showing extra idler gears 10 added to the triple assembly, for increasing the strength, and the fluid flow, or fluid resistance, where greater effectiveness of operation is required, under increased velocities, where the fluid intake flow is somewhat effected by centrifugal force acting upon the rotating fluid mass. The operation and the result is exactly the same as in the former case.

While the fluid control valve 19 is herein illustrated as a slidable plug valve positioned to regulate the fluid outlet port 18, by the attached operating frame H concentrically located with the casing axis, yet it is to be understood that any suitable type of fluid return means, or port valve and valve operating mechanism, for opening, closing or regulating the fluid flow therethrough, will operate my fluid power unit equally as well, and is included herein, as the specific valve design or fluid return is not material to the invention, and also that the fluid outlet port 18 may be positioned at different locations within the chamber E wall without effecting the unit operation, providing suitable operating mechanism may be connected and controlled therewith, as when the device is applied as a wheel brake and the casing 1 in a fixed position. When my device is used as a shaft speed control, or speed reducer, only, the outlet port 18 may be of a predetermined size for the required fluid flow, and the valve 19 omitted, when desired.

My fluid power drive and control unit is especially adaptable to both the automobile driving shaft, and to the automobile wheel brake, and in such installations the port valve operating mechanism H is preferably connected with, and operated by, one of the corresponding operating foot pedals, or by a hand clutch operating lever. In case of the fluid driving unit it is desirable to connect said valve operating mechanism directly with the engine gas accellerator pedal, as the power unit operates directly therewith, and can be fully controlled by the attached hand lever when the automobile is stopped. When the device is installed as an automobile wheel brake unit, as illustrated in the Fig. 12 of the drawings, the fixed shaft 8 is made of a tubular shaft section, or as normally applied, is the automobile axle housing, thus mounting the casing 1 fixedly thereon, and with the automobile wheel 34 mounted on shaft 7, rotatable therewith, said shaft 7 being extended out through the hollow shaft 8 (axle housing), and becomes the automobile rear driving axle having its speed restricted to actual free fluid gear rotations only, and may be restrained, stopped, or locked by the adjusting or closing of the valve 19 within the port 18. The outlet port and valve 19 are redesigned as circular collars. The fluid control drive gear 9 is keyed to the shaft 7 as in the former case. The construction and operation of the unit is exactly the same as previously described, although said casing being fixedly mounted reacts to retard the wheel 34 in the reverse order of the driving unit.

The Fig. 13 illustrates the power driving unit as mounted directly within the automobile flywheel and connected to the engine drive shaft, illustrating the driving power applied through the fixed shaft 8, or casing 1, instead of the rotatable shaft 7 previously described.

Having fully described my fluid power drive and control unit, what I claim as my invention and desired to secure by Letters Patent is:

1. A fluid drive and control unit for transferring power from one rotatable shaft to another, comprising a closed, cylindrical, fluid filled, power casing having a drive shaft section rotatably mounted through one end thereof and a driven shaft section fixedly mounted within the opposite casing end, both positioned concentric with the casing axis, a flat fluid power control unit formed of a spur gear assembly rotatably mounted within a flat surface-fitting gear case, fixedly mounted within the power casing on the rotatable drive shaft end thereof, concentric with said drive shaft and with said gear assembly operatively connected thereto, said gear casing having its inner flat side wall positioned near and across the power casing chamber central section, and designed with a short, raised, central fluid discharge chamber having a central open end discharge port, both chamber and port positioned concentric with and adjacent to the inner drive shaft end, an open fluid inlet port formed through the gear casing forward advancing edge wall, fluid outlet ports formed through the gear casing inner flat side wall, opening into the central discharge chamber, a circular fluid control plug valve slidably mounted on the drive shaft inner end, concentric therewith, designed and positioned to close and regulate said central fluid chamber discharge port, splined means mounted on the shaft end for slidably displacing said control plug valve with respect to the adjacent discharge port.

2. A fluid drive and control unit for transferring power from one rotatable unit to another, comprising a closed, cylindrical, fluid filled power casing having a shaft section rotatably mounted through one end thereof concentric with the casing axis, a flat fluid power control unit formed of a spur gear assembly rotatably mounted within a flat surface-fitting gear case, fixedly mounted within the power casing on the rotatable shaft end thereof, concentric with the shaft and with said gear assembly operatively connected thereto, said gear casing having its inner flat side wall positioned near and across the power casing chamber central section, and designed with a short, raised, central fluid discharge chamber having a central open end discharge port, both chamber and port positioned concentric with and adjacent to the inner shaft end, an open fluid inlet port formed through the gear casing forward advancing edge wall, fluid outlet ports formed through the gear casing inner flat side wall, opening into the central discharge chamber, a circular fluid control plug valve slidably mounted on the shaft and concentric therewith, designed and positioned to close and regulate said central fluid chamber discharge port, splined means mounted on the shaft end for slidably displacing said fluid control plug valve with respect to the adjacent chamber discharge port, and means for fixedly attaching the opposite power casing end to an adjoining, concentric rotatable unit.

3. A fluid power wheel brake unit adapted for regulating, controlling or stopping a connected rotatable wheel unit, and used therewith, comprising a closed, cylindrical, fluid filled, casing having a hollow, tubular axle housing support member fixedly mounted within one casing end for rigidly supporting same, a cylindrical shaft section rotatably mounted through the opposite casing end, both tubular axle and shaft section being positioned concentric with the casing axis, and with the shaft section projected through the tubular axle housing unit, designed for receiving driving power thereon, a flat fluid brake control unit formed of a spur gear assembly rotatably mounted within a flat surface-fitting gear casing, fixedly mounted within the power casing on the rotatable shaft end thereof, concentric with the shaft and with said gear assembly operatively connected thereto, said gear casing having its inner flat side wall positioned near and across the outer casing chamber central section and designed with a short, raised central fluid discharge chamber having a central circular open end discharge port, both positioned concentric with and adjacent to the hollow axle housing end, an open fluid inlet port formed through the gear casing edge wall, fluid outlet ports formed through the gear casing inner flat side wall opening into the central discharge chamber, a central circular fluid control plug valve slidably mounted on the shaft concentric therewith, designed and positioned to close and regulate said central fluid chamber discharge port, and means mounted on the shaft for slidably displacing said control plug valve with respect to the discharge port.

MYRON J. DIKEMAN.

References Cited in the file of this patent

UNITED STATES PATENTS

| Number | Name | Date |
|---|---|---|
| 2,066,450 | Bascle et al. | Jan. 5, 1937 |
| 2,193,806 | DeVore | Mar. 19, 1940 |